US012337604B2

(12) United States Patent
Nakano et al.

(10) Patent No.: US 12,337,604 B2
(45) Date of Patent: Jun. 24, 2025

(54) LIQUID EJECTION APPARATUS

(71) Applicant: BROTHER KOGYO KABUSHIKI KAISHA, Nagoya (JP)

(72) Inventors: Yasuhiro Nakano, Nagoya (JP); Taisei Okuzono, Nagoya (JP); Haruka Azechi, Nagoya (JP); Yushi Deura, Nagoya (JP); Gakuro Kanazawa, Toyokawa (JP); Yuki Tsujimura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 169 days.

(21) Appl. No.: 18/053,011

(22) Filed: Nov. 7, 2022

(65) Prior Publication Data

US 2023/0166499 A1 Jun. 1, 2023

(30) Foreign Application Priority Data

Nov. 30, 2021 (JP) ................................. 2021-194007

(51) Int. Cl.
*B41J 2/21* (2006.01)
*B41J 2/045* (2006.01)
(Continued)

(52) U.S. Cl.
CPC ......... *B41J 2/2132* (2013.01); *B41J 2/04573* (2013.01); *B41J 11/009* (2013.01);
(Continued)

(58) Field of Classification Search
CPC ...................................................... B41J 2/2132
See application file for complete search history.

(56) References Cited

U.S. PATENT DOCUMENTS

2004/0212649 A1* 10/2004 Ouchi .................. B41J 13/0027 347/104
2004/0252149 A1* 12/2004 Laaspere .................. B41J 11/42 347/16
(Continued)

FOREIGN PATENT DOCUMENTS

JP H10279151 A 10/1998
JP 2012171318 A 9/2012

*Primary Examiner* — Shelby L Fidler
(74) *Attorney, Agent, or Firm* — Scully, Scott, Murphy & Presser, P.C.

(57) ABSTRACT

A liquid ejection apparatus includes a medium container, a liquid ejection head, a mover, and a controller. The mover is configured to execute, among a first moving operation of moving a sheet-like medium and a second moving operation of moving the liquid ejection head, at least the first moving operation. The controller causes the liquid ejection head and the mover to alternately or simultaneously perform execution of the first moving operation and execution of ejection and second moving operations, and adjusts at least one selected from the group of an amount of liquid to be ejected, a time interval between the ejection operations when alternately performing execution of the first moving operation and execution of the ejection and second moving operations, and a moving speed of the medium when simultaneously executing the ejection operation and the first moving operation, according to medium information relating to curling of the medium.

9 Claims, 6 Drawing Sheets

EJECTION AMOUNT RATE
(PERCENTAGE OF INK EJECTION AMOUNT
WITH RESPECT TO NORMAL INK EJECTION AMOUNT)

| | CUT SHEET | | ROLL SHEET | |
|---|---|---|---|---|
| | ONE ROLLER | TWO ROLLERS | ONE ROLLER | TWO ROLLERS |
| 0〜10m | 90% | 100% | 80% | 85% |
| 10〜20m | | | 70% | 75% |
| 20m〜 | | | 60% | 65% |

(51) Int. Cl.

| | |
|---|---|
| ***B41J 11/00*** | (2006.01) |
| ***B41J 11/42*** | (2006.01) |
| ***B41J 11/48*** | (2006.01) |

(52) U.S. Cl.

CPC ............ *B41J 11/0095* (2013.01); *B41J 11/42* (2013.01); *B41J 11/48* (2013.01); *B41J 11/0005* (2013.01); *B41J 2203/011* (2020.08)

(56) References Cited

U.S. PATENT DOCUMENTS

| | | | | |
|---|---|---|---|---|
| 2009/0147039 | A1* | 6/2009 | Koase .................. | B41J 11/0005 347/16 |
| 2020/0223222 | A1* | 7/2020 | Omori .................... | B41J 2/2054 |

* cited by examiner

EJECTION AMOUNT RATE
(PERCENTAGE OF INK EJECTION AMOUNT
WITH RESPECT TO NORMAL INK EJECTION AMOUNT)

| | CUT SHEET | | ROLL SHEET | |
|---|---|---|---|---|
| | ONE ROLLER | TWO ROLLERS | ONE ROLLER | TWO ROLLERS |
| 0〜10m | 90% | 100% | 80% | 85% |
| 10〜20m | | | 70% | 75% |
| 20m〜 | | | 60% | 65% |

FIG. 4

WAITING TIME BETWEEN SCANNING PROCESSES

| | CUT SHEET | | ROLL SHEET | |
|---|---|---|---|---|
| | ONE ROLLER | TWO ROLLERS | ONE ROLLER | TWO ROLLERS |
| 0〜10m | 0.5 SECONDS | 0 SECONDS | 1.5 SECONDS | 1 SECOND |
| 10〜20m | | | 2.5 SECONDS | 2 SECONDS |
| 20m〜 | | | 3.5 SECONDS | 3 SECONDS |

FIG. 5

LIQUID EJECTION APPARATUS

REFERENCE TO RELATED APPLICATIONS

This application claims priority from Japanese Patent Application No. 2021-194007 filed on Nov. 30, 2021. The entire content of the priority application is incorporated herein by reference.

BACKGROUND ART

Aspects of the present disclosure relate to a liquid ejection apparatus having a medium container configured to accommodate a sheet-like medium.

In an apparatus configured to eject liquid toward a sheet-like medium, the sheet-like medium may come into contact with a head configured to eject the liquid and the medium may be stained. As control for reducing the stain of the medium (hereinafter referred to as a stain reduction control), operation waiting times may be provided between ejection operations.

DESCRIPTION

In a conventional stain reduction control, if the operation waiting time is long, the time required for the entire operation becomes too long, and if the operation waiting time is short, there is a possibility that the stain reduction effect cannot be secured. Therefore, the degree of the stain reduction control needs to be kept within a necessary and sufficient range according to the possibility of occurrence of stain as much as possible.

At least one aspect of the present disclosure is advantageous to provide one or more improved techniques to achieve a liquid ejection apparatus configured to execute the stain reduction control to a degree corresponding to the possibility of occurrence of stain.

According to aspects of the present disclosure, there is provided a liquid ejection apparatus including a medium container configured to accommodate a sheet-like medium, a liquid ejection head configured to execute an ejection operation of ejecting liquid, a mover configured to move the sheet-like medium fed from the medium container relative to the liquid ejection head, and a controller. The mover is configured to execute, among a first moving operation of moving the sheet-like medium in a first direction and a second moving operation of moving the liquid ejection head in a second direction orthogonal to the first direction, at least the first moving operation. The controller causes the liquid ejection head and the mover to alternately perform execution of the first moving operation and execution of the ejection and second moving operations or to simultaneously execute the ejection operation and the first moving operation, and adjusts at least one selected from the group of an amount of liquid to be ejected from the liquid ejection head in the ejection operation, a time interval between the start of the ejection operation and the start of the next ejection operation when alternately performing execution of the first moving operation and execution of the ejection and second moving operations, and a moving speed of the sheet-like medium by the first moving operation when simultaneously executing the ejection operation and the first moving operation, according to medium information relating to curling of the sheet-like medium and indicating one of or both a characteristic and usage condition of the sheet-like medium fed from the medium container so that contact of the sheet-like medium with the liquid ejection head is suppressed.

According to aspects of the present disclosure, there is further provided a liquid ejection apparatus including a medium container configured to accommodate a sheet-like medium, a liquid ejection head configured to execute an ejection operation of ejecting liquid, a mover configured to move the sheet-like medium fed from the medium container relative to the liquid ejection head, the mover including a first roller pair configured to move the sheet-like medium fed from the medium container along a first conveying direction while nipping the sheet-like medium, and a second roller pair configured to move the sheet-like medium moved by the first roller pair along the first direction while nipping the sheet-like medium downstream of the first roller pair in the first direction, and a controller. The mover is configured to execute, among a first moving operation of moving the sheet-like medium in a first direction and a second moving operation of moving the liquid ejection head in a second direction orthogonal to the first direction, at least the first moving operation. The controller causes the liquid ejection head and the mover to alternately perform execution of the first moving operation and execution of the ejection and second moving operations or to simultaneously execute the ejection operation and the first moving operation, and adjusts at least one selected from the group of an amount of liquid to be ejected from the liquid ejection head in the ejection operation, a time interval between the start of the ejection operation and the start of the next ejection operation when alternately performing execution of the first moving operation and execution of the ejection and second moving operations, and a moving speed of the sheet-like medium by the first moving operation when simultaneously executing the ejection operation and the first moving operation, according to whether the first roller pair and the second roller pair are both nipping the sheet-like medium or only one of the first roller pair and the second roller pair is nipping the sheet-like medium so that contact of the sheet-like medium with the liquid ejection head is suppressed.

According to aspects of the present disclosure, there is further provided a liquid ejection apparatus including a medium container configured to accommodate a sheet-like medium, a liquid ejection head configured to execute an ejection operation of ejecting liquid, a mover configured to move the sheet-like medium fed from the medium container relative to the liquid ejection head, and a controller. The mover is configured to execute a first moving operation of moving the sheet-like medium in a first direction and a second moving operation of moving the liquid ejection head in a second direction orthogonal to the first direction. The controller causes the liquid ejection head and the mover to alternately perform execution of the first moving operation and execution of the ejection and second moving operations, and adjusts one of or both an amount of liquid to be ejected from the liquid ejection head in the ejection operation, and a moving speed of the sheet-like medium by the first moving operation between the start of the ejection operation and the start of the next ejection operation, according to medium information relating to curling of the sheet-like medium and indicating one of or both a characteristic and usage condition of the sheet-like medium fed from the medium container so that contact of the sheet-like medium with the liquid ejection head is suppressed.

According to aspects of the present disclosure, there is further provided a liquid ejection apparatus including a medium container configured to accommodate a sheet-like medium, a liquid ejection head configured to execute an ejection operation of ejecting liquid, a mover configured to move the sheet-like medium fed from the medium container relative to the liquid ejection head, the mover including a first roller pair configured to move the sheet-like medium fed from the medium container along a first conveying direction while nipping the sheet-like medium, and a second roller pair configured to move the sheet-like medium moved by the first roller pair along the first direction while nipping the sheet-like medium downstream of the first roller pair in the first direction, and a controller. The mover is configured to execute a first moving operation of moving the sheet-like medium in a first direction and a second moving operation of moving the liquid ejection head in a second direction orthogonal to the first direction. The controller causes the liquid ejection head and the mover to alternately perform execution of the first moving operation and execution of the ejection and second moving operations, and adjusts one of or both an amount of liquid to be ejected from the liquid ejection head in the ejection operation, and a moving speed of the sheet-like medium by the first moving operation between the start of the ejection operation and the start of the next ejection operation, according to whether the first roller pair and the second roller pair are both nipping the sheet-like medium or only one of the first roller pair and the second roller pair is nipping the sheet-like medium so that contact of the sheet-like medium with the liquid ejection head is suppressed.

FIG. 4 is a table showing a relationship between a characteristic and usage condition of a sheet and an ink ejection rate used in a stain reduction control of the printer shown in FIG. 1.

FIG. 5 is a table showing a relationship between the characteristic and usage condition of the sheet and a length of a waiting time between canning processes used in the stain reduction control of the printer shown in FIG. 1.

Hereinafter, a printer 100 as an illustrative embodiment according to aspects of the present disclosure will be described with reference to FIGS. 1 to 5. An up-down direction, a front-rear direction and a left-right direction shown in FIG. 1 are referred to as a vertical direction, a longitudinal direction and a lateral direction of the printer 100.

Figure 1:
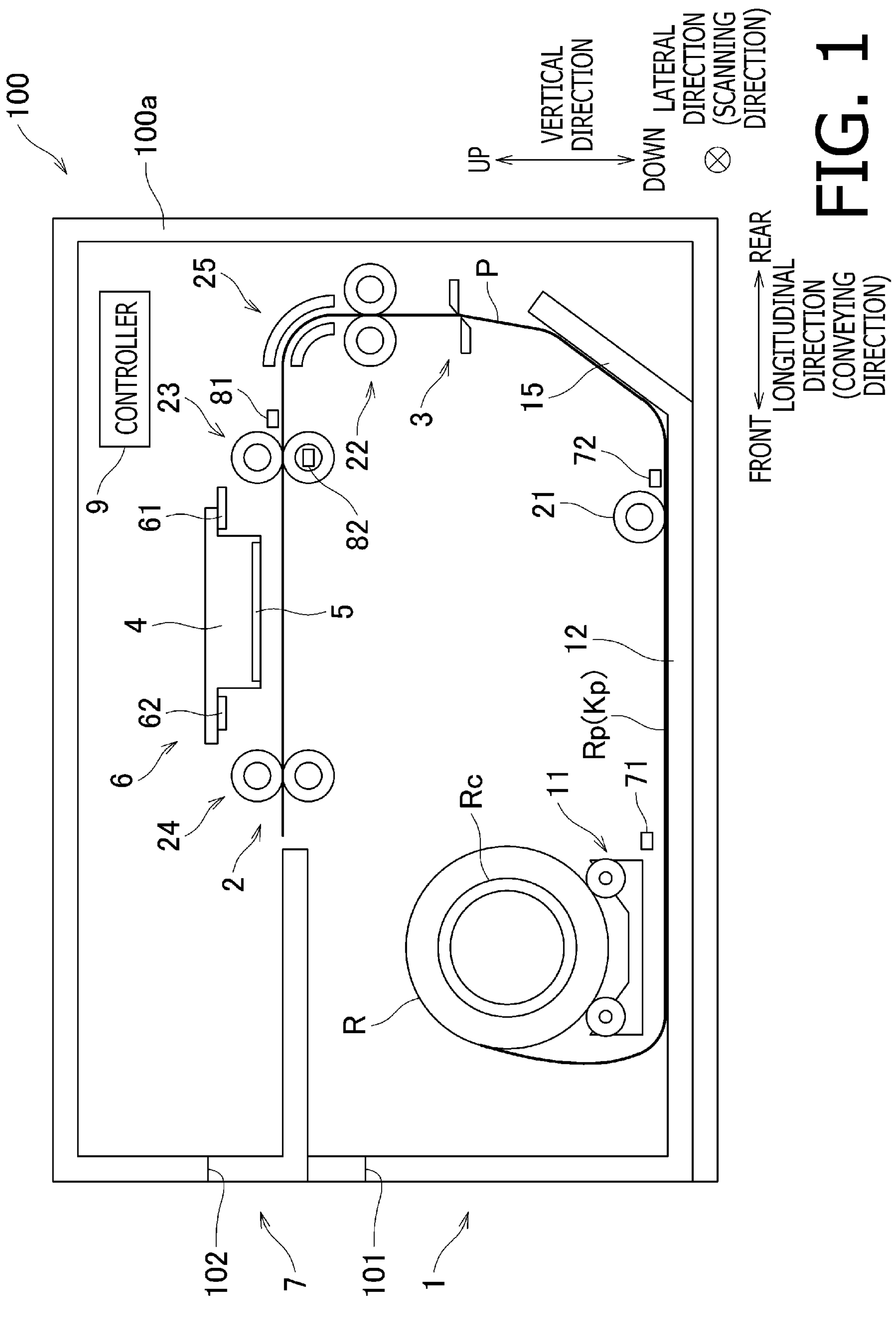
FIG. 1 is a schematic side view showing an internal structure of a printer.
Figure 2:
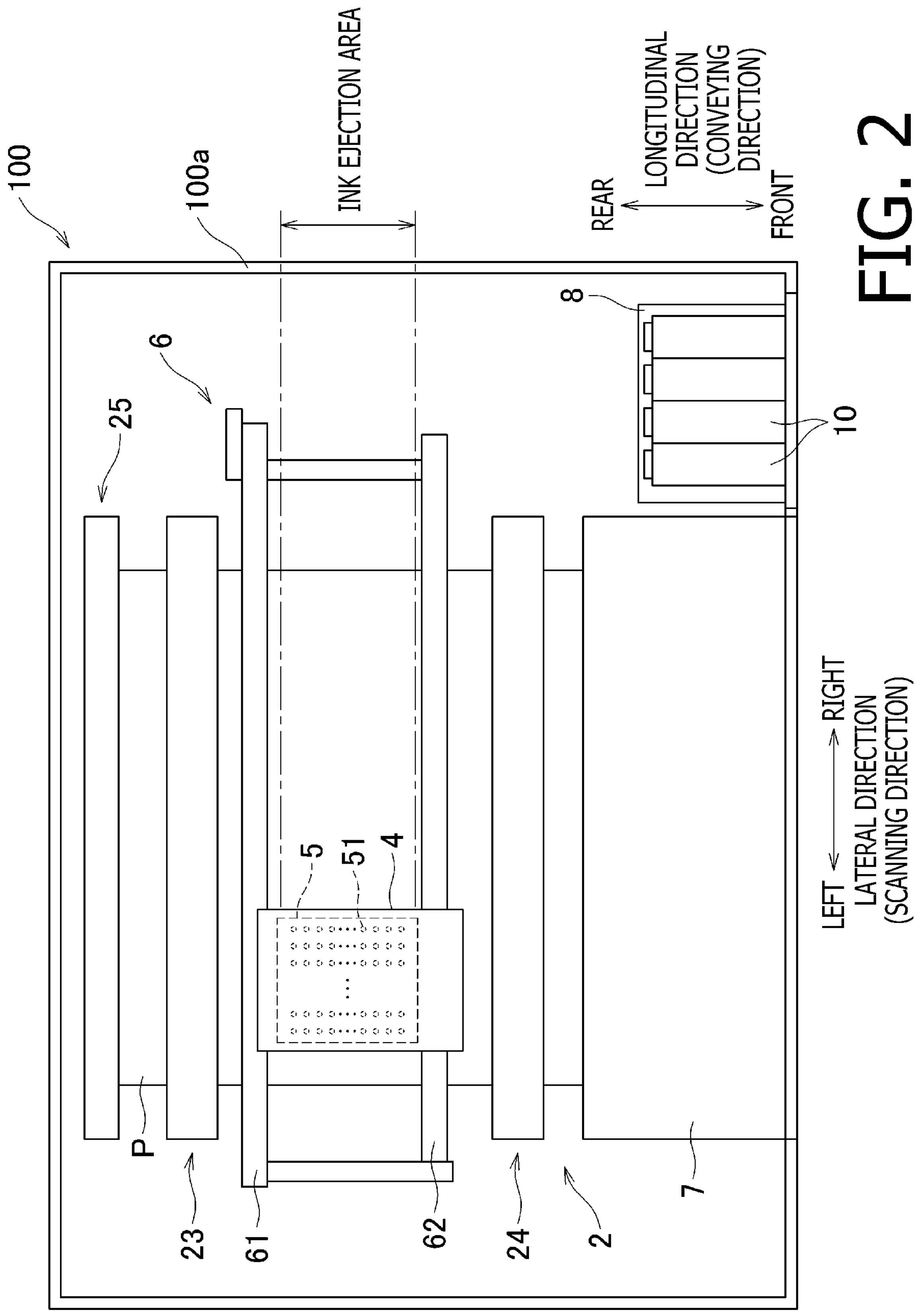
FIG. 2 is a schematic plan view of the printer shown in FIG. 1.

As shown in FIGS. 1 and 2, the printer 100 mainly includes a housing 100*a*, a feed tray 1, a conveying mechanism 2, a cutter 3, a carriage 4, a head 5, a moving mechanism 6, a discharge tray 7, a cartridge mount 8, and a controller 9.

The feed tray 1 is disposed inside the housing 100*a* below the head 5. The feed tray 1 can be inserted into and removed from the housing 100*a* in the longitudinal direction through an opening 101 formed on a front wall of the housing 100*a*.

The feed tray 1 is configured to accommodate a roll body R and cut sheets Kp. The feed tray 1 may be capable of accommodating the roll body R and the cut sheets Kp at the same time, or may be capable of selectively accommodating either the roll body R or the cut sheets Kp. The feed tray 1 includes a roll body support 11 configured to support the roll body R and a placing surface 12 on which the cut sheets Kp are to be placed.

The roll body R is formed by winding a long sheet around an outer periphery of a cylindrical core member Rc. The cut sheet Kp is shorter than the long sheet constituting the roll body R and is, for example, of a standard size of A4 or B5. The maximum size of the cut sheet Kp that can be used in the printer 100 is A4.

A roll body sensor 71 is provided slightly behind the roll body support 11. The roll body sensor 71 can detect whether or not the roll body R is accommodated in the roll body support 11 of the feed tray 1. Specifically, the roll body sensor 71 detects that the roll body R is supported by the roll body support 11 by detecting a roll sheet Rp unwound from the roll body R. The detection result of the roll body sensor 71 is output to the controller 9.

The conveying mechanism 2 includes a feed roller 21, an intermediate roller pair 22, a conveying roller pair 23, a discharge roller pair 24, and a guide member 25.

The feed roller 21 feeds the roll sheet Rp unwound from the roll body R supported by the roll body support 11 or the cut sheet Kp placed on the placing surface 12 from the feed tray 1. In the following description, when the roll sheet Rp and the cut sheet Kp are not distinguished, they are referred to as a "sheet P."

Figure 3:
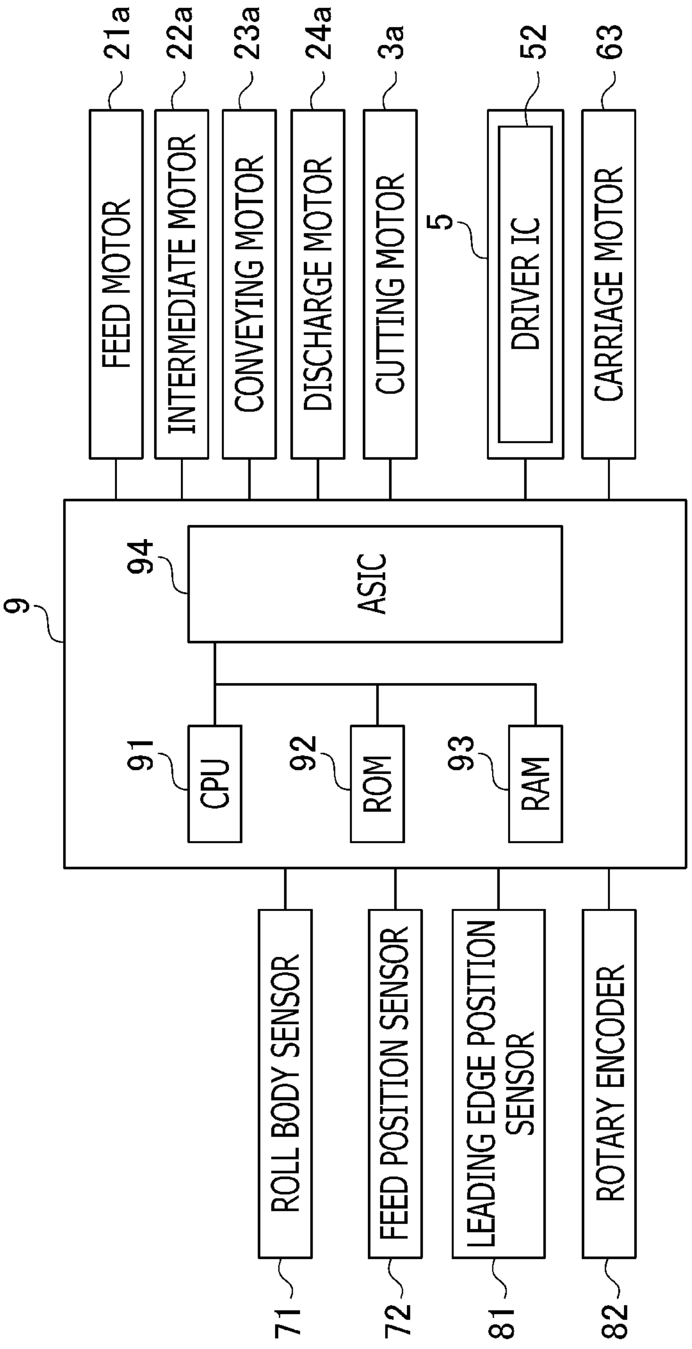
FIG. 3 is a block diagram showing an electrical configuration of the printer shown in FIG. 1.

The feed roller 21 is configured to be rotated by driving of a feed motor 21*a* (see FIG. 3). When the feed motor 21*a* is driven under the control by the controller 9, the feed roller 21 rotates and a conveying force in a direction from the front to the rear is applied to the sheet P in contact with the feed roller 21. The sheet P is thereby fed from the feed tray 1. A rear wall 15 provided at a rear end portion of the feed tray 1 is inclined so that an upper end is located behind a lower end. Therefore, the sheet P fed from the feed tray 1 moves obliquely upward.

A feed position sensor 72 is provided slightly behind the feed roller 21. The feed position sensor 72 can detect whether the sheet P is at a position where the sheet P can be fed by the feed roller 21. The detection result of the feed position sensor 72 is output to the controller 9.

The intermediate roller pair 22 includes a drive roller configured to be rotated by driving of an intermediate motor 22*a* (see FIG. 3) and a driven roller configured to rotate along with the drive roller. When the intermediate motor 22*a* is driven under the control by the controller 9, the rollers of the intermediate roller pair 22 rotate while nipping the sheet P and convey the sheet P. The intermediate roller pair 22 is disposed above a rear end of the feed tray 1. The intermediate roller pair 22 nips and conveys upward the sheet P fed from the feed tray 1 by the feed roller 21 and moving obliquely upward. The guide member 25 is disposed above the intermediate roller pair 22. The guide member 25 guides forward the sheet P conveyed upward by the intermediate roller pair 22.

The conveying roller pair 23 includes a drive roller configured to be rotated by driving of a conveying motor 23*a* (see FIG. 3) and a driven roller configured to rotate along with the drive roller. The driven roller of the conveying roller pair 23 is provided with a rotary encoder 82. The rotary encoder 82 can detect a rotation amount of the conveying roller pair 23 by detecting a rotation amount of the driven roller. The rotary encoder 82 outputs a signal indicating the rotation amount of the conveying roller pair 23 to the controller 9. The discharge roller pair 24 includes a drive roller configured to be rotated by driving of a discharge motor 24*a* (see FIG. 3) and a driven roller configured to rotate along with the drive roller.

When the conveying motor 23*a* and the discharge motor 24*a* are driven under the control by the controller 9, the rollers of the conveying roller pair 23 and the rollers of the discharge roller pair 24 rotate while nipping the sheet P and convey the sheet P forward in a conveying direction. The conveying roller pair 23 is disposed behind (upstream in the conveying direction of) the head 5, and the discharge roller pair 24 is disposed in front of (downstream in the conveying direction of) the head 5. The conveying roller pair 23 conveys the sheet P, which has been guided forward by the guide member 25, further forward toward the discharge roller pair 24. The discharge roller pair 24 conveys the sheet P, which has been conveyed forward by the conveying roller pair 23, further forward while nipping the sheet P, and discharges the sheet P onto the discharge tray 7.

A leading edge position sensor 81 is provided slightly behind the conveying roller pair 23. When a leading edge of the sheet P is detected, the leading edge position sensor 81 outputs the detection result to the controller 9. A timing at which the leading edge position sensor 81 detects the leading edge of the sheet P is adjusted so as to coincide or substantially coincide with a timing at which the leading edge of the sheet P reaches the conveying roller pair 23.

The cutter 3 is disposed between the rear end of the feed tray 1 and the intermediate roller pair 22. The cutter 3 includes, for example, a disc-shaped rotating blade and a driven blade. By driving a cutting motor 3*a* (see FIG. 3), the rotating blade of the cutter 3 rotates and the cutter 3 reciprocates in the lateral direction. By driving the cutting motor 3*a* under the control by the controller 9, the roll sheet Rp that has been unwound from the roll body R and conveyed is cut in a width direction of the roll sheet Rp by the cutter 3. Thereby, a rear end is formed to the roll sheet Rp, and the cut roll sheet Rp is discharged onto the discharge tray 7 as one sheet.

The head 5 includes a plurality of nozzles 51 (see FIG. 2) formed on a lower surface thereof, and a driver IC 52 (see FIG. 3). When the driver IC 52 is driven under the control by the controller 9, ink is ejected from the nozzles 51, and an image is recorded in an ink ejection area (see FIG. 2) on the sheet P when the sheet P conveyed by the conveying mechanism 2 passes through an image recording position opposed to the lower surface of the head 5. The head 5 is mounted on a carriage 4.

The moving mechanism 6 includes two guide rails 61 and 62, and a carriage motor 63 (see FIG. 3). The two guide rails 61 and 62 are spaced apart from each other in the longitudinal direction and respectively extend in the lateral direction. The carriage 4 is disposed to straddle the two guide rails 61 and 62. The carriage 4 is connected to the carriage motor 63 via a conventionally-known belt or the like. When the carriage motor 63 is driven under the control by the controller 9, the carriage 4 moves in the lateral direction (scanning direction) along the guide rails 61 and 62.

The discharge tray 7 is disposed inside the housing in front of the head 5 and above the feed tray 1. The discharge tray 7 can be inserted into and removed from the housing 100*a* in the longitudinal direction through the opening 102 formed on the front wall of the housing 100*a*. The sheet P on which an image has been recorded by the head 5 is accommodated in the discharge tray 7.

As shown in FIG. 2, the cartridge mount 8 is provided on one side (right side) of the discharge tray 7 in the lateral direction and on the front side of the moving mechanism 6 in the longitudinal direction. Four ink cartridges 10 storing black, yellow, cyan, and magenta inks, respectively, can be detachably mounted to the cartridge mount 8. Ink is supplied from each ink cartridge 10 mounted on the cartridge mount 8 to the head 5 via a conventionally-known tube or the like.

The controller 9 controls the entire printer 100. As shown in FIG. 3, the feed motor 21*a*, the intermediate motor 22*a*, the conveying motor 23*a*, the discharge motor 24*a*, the cutting motor 3*a*, the driver IC 52, the carriage motor 63, the roll body sensor 71, the feed position sensor 72, leading edge position sensor 81, the rotary encoder 82 and the like are electrically connected to the controller 9.

As shown in FIG. 3, the controller 9 includes a Central Processing Unit (CPU) 91, a Read Only Memory (ROM) 92, a Random Access Memory (RAM) 93, an Application Specific Integrated Circuit (ASIC) 94 and the like. The ROM 92 stores programs executed by the CPU 91 and the ASIC 94, various pieces of fixed data, and the like. The RAM 93 temporarily stores data (such as image data) necessary to execute the programs.

The various pieces of fixed data stored in the ROM 92 include data indicating sizes of the cut sheet Kp, a path length along a conveying path of the sheet P from the cutter 3 to the conveying roller pair 23, a distance in the longitudinal direction from the conveying roller pair 23 to the discharge roller pair 24, and a distance in the longitudinal direction from the conveying roller pair 23 to the image recording position by the head 5. The various pieces of fixed data also include data indicating a relationship between the number of rotations of the conveying roller pair 23 and a length of the sheet P. In the control by the controller 9 which will be described below, the length of the sheet P conveyed by the conveying roller pair 23 is calculated based on the number of rotations of the conveying roller pair 23 indicated by the detection result of the rotary encoder 82 and the above-described data. The various pieces of fixed data further include data indicating tables shown in FIGS. 4 and 5 which will be described later.

The controller 9 may be one in which only the CPU 91 performs various processes, one in which only the ASIC 94 performs various processes, or one in which the CPU 91 and the ASIC 94 cooperate to perform various processes. The controller 9 may be one in which one CPU 91 performs processes independently, or one in which a plurality of CPUs 91 perform processes in a shared manner. The controller 9 may be one in which one ASIC 94 performs processes independently, or one in which a plurality of ASICs 94 perform processes in a shared manner.

The controller 9 causes the printer 100 to record an image on a sheet P based on a recording instruction transmitted from an external device (e.g., a PC or a smartphone) by a user. The image recording is performed by alternately and repeatedly performing a conveying process in which the sheet P is conveyed by the conveying mechanism 2 by a prescribed distance in the conveying direction, and a scanning process in which ink is ejected from a plurality of nozzles 51 of the head 5 to the ink ejection area shown in FIG. 2 while the carriage 4 is moved in the scanning direction by the moving mechanism 6. The ink ejection area shown in FIG. 2 is an area on the sheet P where ink is ejected from the head 5 in each scanning process. This area may be an area having the same length as the prescribed distance in the conveying direction, or an area having a length different from the prescribed distance in the conveying direction. When the sheet P is the roll sheet Rp, the roll sheet Rp receives the ink ejected from the head 5 while being conveyed by the conveying mechanism 2. On the other hand, the roll sheet Rp is cut into a desired length (e.g., a length indicated by the recording instruction) with the cutter 3. Thus, the roll sheet Rp becomes a recorded sheet having the desired length (hereinafter referred to as a "cut length") and is discharged onto the discharge tray 7. When the sheet P is the cut sheet Kp, the cut sheet Kp receives the ink ejected from the head 5 while being conveyed by the conveying mechanism 2. Thus, the cut sheet Kp becomes a sheet and is discharged onto the discharge tray 7.

Based on the detection results of the leading edge position sensor 81 and the rotary encoder 82, the controller 9 controls the image recording and the cutting of the roll sheet Rp while grasping the relative position of the sheet P with respect to the conveying roller pair 23 (hereinafter, a relative position with respect to the conveying roller pair will be simply referred to as a "relative position"). The relative position of the sheet P is acquired as follows. Based on the detection result of the rotary encoder 82, the controller 9 acquires the number of rotations of the conveying roller pair 23 from the timing when the leading edge position sensor 81 detects the leading edge of the sheet P to an arbitrary timing during which the sheet P is conveyed by the conveying roller pair 23. Based on the acquired number of rotations, the controller 9 acquires a length of the sheet P conveyed by the conveying roller pair 23 from the timing when the leading edge of the sheet P reaches (or substantially reaches) the conveying roller pair 23 to the arbitrary timing. Based on this length, the controller 9 acquires a position of the leading edge of the sheet P (the roller sheet Rp or the cut sheet Kp) with respect to the conveying roller pair 23, that is, the relative position of the leading edge of the sheet P.

For example, based on the relative position of the leading edge of the roll sheet Rp and the path length from the cutter 3 to the conveying roller pair 23 stored in the ROM 92, the controller 9 causes the cutter 3 to cut the roll sheet Rp at a timing when a length from the leading edge of the roll sheet Rp to the position of the cutter 3 just reaches the cut length. As another example, based on the relative position of the leading edge of the sheet P and the distance from the conveying roller pair 23 to the image recording position stored in the ROM 92, the controller 9 acquires a position on the sheet P where image recording is being performed at an arbitrary timing.

When recording an image on the sheet P, the sheet P may rise and come into contact with the head 5 when ink ejected from the head 5 reaches the sheet P, thereby causing the sheet P to become stained. The controller 9 executes the stain reduction control to suppress the occurrence of such a problem. The stain reduction control includes (1) a control to reduce the amount of ink ejected from the head 5, and (2) a control to provide a waiting time between successive scanning processes in the image recording. The controller 9 executes one of or both (1) and (2) as the stain reduction control when a preset execution condition is satisfied. The execution condition includes, for example, an elapse of a prescribed time since the previous execution, an instruction to execute the stain reduction control has been made by the user through a recording instruction from an external device, and the like.

In addition, the controller 9 adjusts parameters for the stain reduction control as follows based on various detection results input from the roll body sensor 71, the feed position sensor 72, the leading edge position sensor 81, and the rotary encoder 82. In order to adjust the parameters, the controller 9 performs the following sheet type determination process, cumulative used length acquisition process, and roller nipping state acquisition process based on the various detection results described above.

As the sheet type determination process, the controller 9 determines whether the sheet P fed from the feed tray 1 by the feed roller 21 is the roll sheet Rp or the cut sheet Kp. This determination is made based on the detection results of the roll body sensor 71 and the feed position sensor 72. Specifically, when the roll body sensor 71 detects that the roll sheet Rp is supported by the roll body support 11 and the feed position sensor 72 detects that the sheet P is positioned at the feed position, the controller 9 determines that the sheet P fed by the feed roller 21 is the roll sheet Rp. On the other hand, when the roll body sensor 71 detects that the roll sheet Rp is not supported by the roll body support 11 and the feed position sensor 72 detects that the sheet P is positioned at the feed position, the controller 9 determines that the sheet P fed by the feed roller 21 is the cut sheet Kp. The determination may be made based only on the detection result of the roll body sensor 71 indicating whether or not the roll sheet Rp is supported by the roll body support 11. Alternatively, the determination may be made based on whether the recording instruction transmitted from an external device instructs recording on the roll sheet Rp or the cut sheet Kp, in addition to or in place of the detection results of the roll body sensor 71 and the feed position sensor 72.

As the cumulative used length acquisition process, the controller 9 calculates a cumulative used length after the roll sheet Rp on the roll body support 11 is first unrolled and used. This calculation is performed based on the detection results of the roll body sensor 71, the leading edge position sensor 81, and the rotary encoder 82. Specifically, based on the detection results of the roll body sensor 71, the controller 9 determines that a state of the roll sheet Rp has changed from a state in which the roll sheet Rp is not supported by the roll body support 11 to a state in which the roll sheet Rp is supported by the roll body support 11. Thus, it is detected that the roll sheet Rp is first unrolled and used.

Then, based on the detection result of the rotary encoder 82, the controller 9 integrates a length of the roll sheet Rp conveyed by the conveying roller pair 23 after the roll sheet Rp is first unrolled and used up to an arbitrary timing. Based on the integration result, for example, the controller 9 calculates at least one of the following first to third cumulative used lengths.

The first cumulative used length is the cumulative used length up to the leading edge of the roll sheet Rp being conveyed by the conveying mechanism 2 at a certain timing. This cumulative used length corresponds to the integration result up to the point immediately before the leading edge of the roll sheet Rp at the certain timing reaches the conveying roller pair 23.

The second cumulative used length is the cumulative used length up to a trailing edge of the roll sheet Rp being conveyed by the conveying mechanism 2 at the certain timing. This cumulative used length corresponds to a value obtained by adding the cut length of the roll sheet Rp to the integration result up to the point immediately before the leading edge of the roll sheet Rp at the certain timing reaches the conveying roller pair 23.

The third cumulative used length is a cumulative used length up to a position where image recording is performed on the sheet P at a certain timing. This cumulative used length corresponds to a value obtained by adding a length from the leading edge of the sheet P to the position where image recording is performed at the certain timing to the integration result up to the point immediately before the leading edge of the sheet P under recording reaches the conveying roller pair 23. The position where image recording is performed is any position in the conveying direction within the ink ejection area in FIG. 2. The position where image recording is performed is acquired based on the relative position of the leading edge of the sheet P acquired based on the detection results of the leading edge position sensor 81 and the rotary encoder 82 and the distance from the conveying roller pair 23 to the image recording position stored in the ROM 92.

As the roller nipping state acquisition process, the controller 9 determines, at an arbitrary timing during image recording, whether the sheet P is nipped by both of the conveying roller pair 23 and the discharge roller pair 24 or by only one of them. This determination is performed based on the detection results of the leading edge position sensor 81 and the rotary encoder 82. Specifically, the controller 9 determines whether the sheet P is nipped by both of the conveying roller pair 23 and the discharge roller pair 24 or by only one of them based on the relative position of the leading edge of the sheet P and the length of the sheet P (the length of the cut sheet Kp stored in the ROM 92 or the cut length of the roll sheet Rp).

The controller 9 adjusts the ink ejection amount in the above-described stain reduction control (1) based on the data indicating the table of FIG. 4 stored in the ROM 92. The table of FIG. 4 shows the relationship between the sheet type ("cut sheet" and "roll sheet"), a range of the cumulative used length ("0 to 10 m," "10 to 20 m," and "over 20 m"), the roller nipping state ("one roller" and "two rollers"), and a rate indicating the adjusted ink ejection amount (hereinafter referred to as an "ejection amount rate"). The sheet type indicates whether the sheet P conveyed by the conveying mechanism 2 is the cut sheet Kp or the roll sheet Rp. The range of the cumulative used length indicates whether any one of the first to third cumulative used lengths corresponds to "0 to 10 m," "10 to 20 m," or "over 20 m." The roller nipping state "one roller" indicates that the sheet P is nipped by only one of the conveying roller pair 23 and the discharge roller pair 24. The roller nipping state "two rollers" indicates that the sheet P is nipped by both of the conveying roller pair 23 and the discharge roller pair 24. The ejection amount rate indicates the ratio in percent of the ink ejection amount when the stain reduction control is performed to the ink ejection amount when the stain reduction control is not performed. The smaller the ejection amount rate, the higher the degree of reduction of the ejection amount.

The degree of reduction of the ejection amount indicated by the ejection amount rate in the table of FIG. 4 is higher for the "roll sheet" than for the "cut sheet." For example, when the roller nipping state is "one roller", the ejection amount ratio for the "cut sheet" is 90% while the ejection amount ratio for the "roll sheet" is 60 to 80%. When the roller nipping state is "two rollers," the ejection amount ratio for the "cut sheet" is 100% while the ejection amount ratio for the "roll sheet" is 65 to 85%. The degree of reduction of the ejection amount indicated by the ejection amount ratio in the table of FIG. 4 becomes higher as the cumulative used length gets longer and is higher for the roller nipping state "one roller" than "two rollers." For example, when the sheet P is the cut sheet, the ejection amount ratio for "two rollers" is 100% while the ejection amount ratio for "one roller" is 90%. When the sheet P is a roll sheet, the ejection amount ratio for "two rollers" is 85%, 75% and 65% according to the increase in the cumulative used length, while the ejection amount ratio for "one roller" is 80%, 70% and 60% according to the increase in the cumulative used length.

The controller 9 acquires the ejection amount rate from the table in FIG. 4 based on the determination and calculation results of the sheet type determination process, the cumulative used length acquisition process, and the roller nipping state acquisition process, and controls image recording so that the ink ejection amount is reduced at the acquired ejection amount rate. Specifically, the controller 9 adjusts the amount of ink to be ejected from the head 5 to the amount of ink obtained by reducing the amount of ink to be ejected from the head 5 when the stain reduction control is not performed according to the ejection amount rate acquired from the table in FIG. 4. Such adjustment of the ejection amount is applied to one sheet P (one cut sheet Kp or one roll sheet Rp separated from the roll body R) which is subjected to the image recording at the timing of the execution of the stain reduction control. When either the first or the second cumulative used length is used as the cumulative used length, the ejection amount is adjusted so that the ejection amount is uniformly reduced for the entire sheet P by the ejection amount rate acquired based on the first or the second cumulative used length. When the third cumulative used length is used as the cumulative used length, the third cumulative used length is acquired for each position where the scanning process is performed (i.e., a position where the next image recording will be performed) each time the scanning process is performed. Then, each scanning process is performed while the ink ejection amount is reduced with the ejection amount rate in the table in FIG. 4 corresponding to the acquired third cumulative used length.

The controller 9 further adjusts the length of the waiting time for the stain reduction control (2) based on the data indicating the table of FIG. 5 stored in the ROM 92. The table of FIG. 5 shows the relationship between the sheet type ("cut sheet" and "roll sheet"), the range of the cumulative used length ("0 to 10 m," "10 to 20 m," and "over 20 m"), the roller nipping state ("one roller" and "two rollers"), and the length of the waiting time. The meanings of the sheet type, the cumulative used length, and the roller nipping state in the table of FIG. 5 are the same as those for the table of FIG. 4. Times in the table indicate a length of a waiting time provided between successive scanning processes when the stain reduction control is performed.

The waiting time shown in the table of FIG. 5 is longer for "roll sheet" than for "cut sheet." For example, when the roller nipping state is "one roller," the waiting time for "cut sheet" is 0.5 seconds, while the waiting time for "roll sheet" is 1.5 to 3.5 seconds. When the roller nipping state is "two rollers," the waiting time for "cut sheet" is 0 seconds, while the waiting time for "roll sheet" is 1 to 3 seconds. The waiting time shown in the table of FIG. 5 becomes longer as the accumulated used length gets longer and is longer for the roller nipping state "one roller" than "two rollers." For example, when the sheet P is "cut sheet," the waiting time for "two rollers" is 0 seconds, while the waiting time for "one roller" is 0.5 seconds. When the sheet P is "roll sheet," the waiting time for "two rollers" is 1 second, 2 seconds, and 3 according to the increase in the cumulative used length, while the waiting time for "one roller" is 1.5 seconds, 2.5 seconds, and 3.5 seconds according to the increase in the cumulative used length.

The controller 9 acquires the length of the waiting time from the table of FIG. 5 based on the determination and calculation results of the sheet type determination process, the cumulative used length acquisition process, and the roller nipping state acquisition process, and controls image recording so that the waiting time of the acquired length is set between successive scanning processes. Specifically, the controller 9 adds a period during which both the ink ejection from the head 5 and the conveyance of the sheet P are stopped between the scanning processes so that a time interval between a start of a scanning process and a start of the next scanning process becomes a length obtained by adding the length of the waiting time to the original time interval when the stain reduction control is not performed.

When either the first or second cumulative used length is used as the cumulative used length, the controller 9 sets the waiting time between the scanning processes with the length acquired based on the first or second cumulative used length for the entire sheet P. When the third cumulative used length is used as the cumulative used length, the controller 9 acquires the third cumulative used length for a position where the scanning process is to be performed (i.e., a position where the next image recording is to be performed) each time the scanning process is performed. Then, the waiting time of the length according to the table of FIG. 5 corresponding to the acquired third cumulative used length is set between successive scanning processes.

As described above, as the stain reduction control, one of or both (1) the control to reduce the amount of ink ejected from the head 5 and (2) the control to provide a waiting time between successive scanning processes in the image recording are executed. According to the control (1), since the amount of ink is reduced, the occurrence of the rise of the sheet P when ink ejected from the head 5 reaches the sheet P is suppressed. According to the control (2), since the waiting time is provided between scanning processes, even if the sheet P rises once by one scanning process, the rising is likely to be settled by the next scanning process. Therefore, the occurrence of stains on the sheet can be suppressed by either of the controls (1) and (2).

The ink ejection amount rate in the control (1) or the length of the waiting time in the control (2) is adjusted as a parameter of the stain reduction control based on the sheet type, the cumulative used length, and the roller nipping state. Among these, the sheet type corresponding to the characteristics of the sheet P and the cumulative used length corresponding to the use state of the sheet P are both information related to the degree of occurrence of curling in the sheet P. With respect to the sheet type, the roll sheet Rp is more likely to curl than the cut sheet Kp. With respect to the cumulative used length, considering the mode of use the roll sheet Rp, that is, the roll sheet Rp being used after being unrolled from the roll body R formed by winding a long sheet around the core member Rc, the roll sheet Rp tends to have a higher degree of curling as the cumulative used length increases. When curling of the sheet P occurs, the sheet P is likely to contact the head 5, and the risk of the contact increases as the degree of curling increases. Therefore, the stain reduction control according to the curling state is realized by adjusting the content of the stain reduction control according to the sheet type and the cumulative used length which are information related to the occurrence of curling as described above.

The roller nipping state affects the likeliness of contact of the sheet P being conveyed by the conveying roller pair 23 and the discharge roller pair 24 with the head 5. That is, when the sheet P is nipped by both of the conveying roller pair 23 and the discharge roller pair 24, the possibility of the sheet P coming into contact with the head 5 between the nipping positions by the two roller pairs is lower than when the medium is nipped by only one of the two roller pairs. Therefore, the stain reduction control to a degree corresponding to the possibility of occurrence of stain is realized by adjusting the content of the stain reduction control according to the nipping state of the two roller pairs.

The stain reduction control is performed according to the tables shown in FIGS. 4 and 5. As described above, in the tables shown in FIGS. 4 and 5, "roll sheet" has a higher degree of reduction in the ink ejection amount and a longer waiting time than "cut sheet." Furthermore, the longer the cumulative used length is, the higher the degree of reduction in the ink ejection amount is and the longer the waiting time is. The higher the degree of reduction in the ink ejection amount is, the more the occurrence of curl is suppressed. The longer the waiting time is, the lower the possibility of the sheet P coming into contact with the head 5 becomes. The more the occurrence of curl and the contact of the sheet P with the head 5 are suppressed, the more the occurrence of stain on the sheet P is suppressed. That is, the tables shown in FIGS. 4 and 5 are adjusted so the stain reduction effect is secured within an appropriate range according to the degree of curling. When only one of the conveying roller pair 23 and the discharge roller pair 24 nips the sheet P, compared to when both the conveying roller pair 23 and the discharge roller pair 24 nip the sheet P, the degree of reduction in the ink ejection amount is higher, and the waiting time is longer. In other words, the tables shown in FIGS. 4 and 5 are adjusted so as to secure the stain reduction effect within an appropriate range according to the nipping state by the roller pairs. Therefore, the stain reduction control is performed appropriately to a degree corresponding to the possibility of occurrence of stain by adjusting parameters based on the tables shown in FIGS. 4 and 5.

Figure 6:
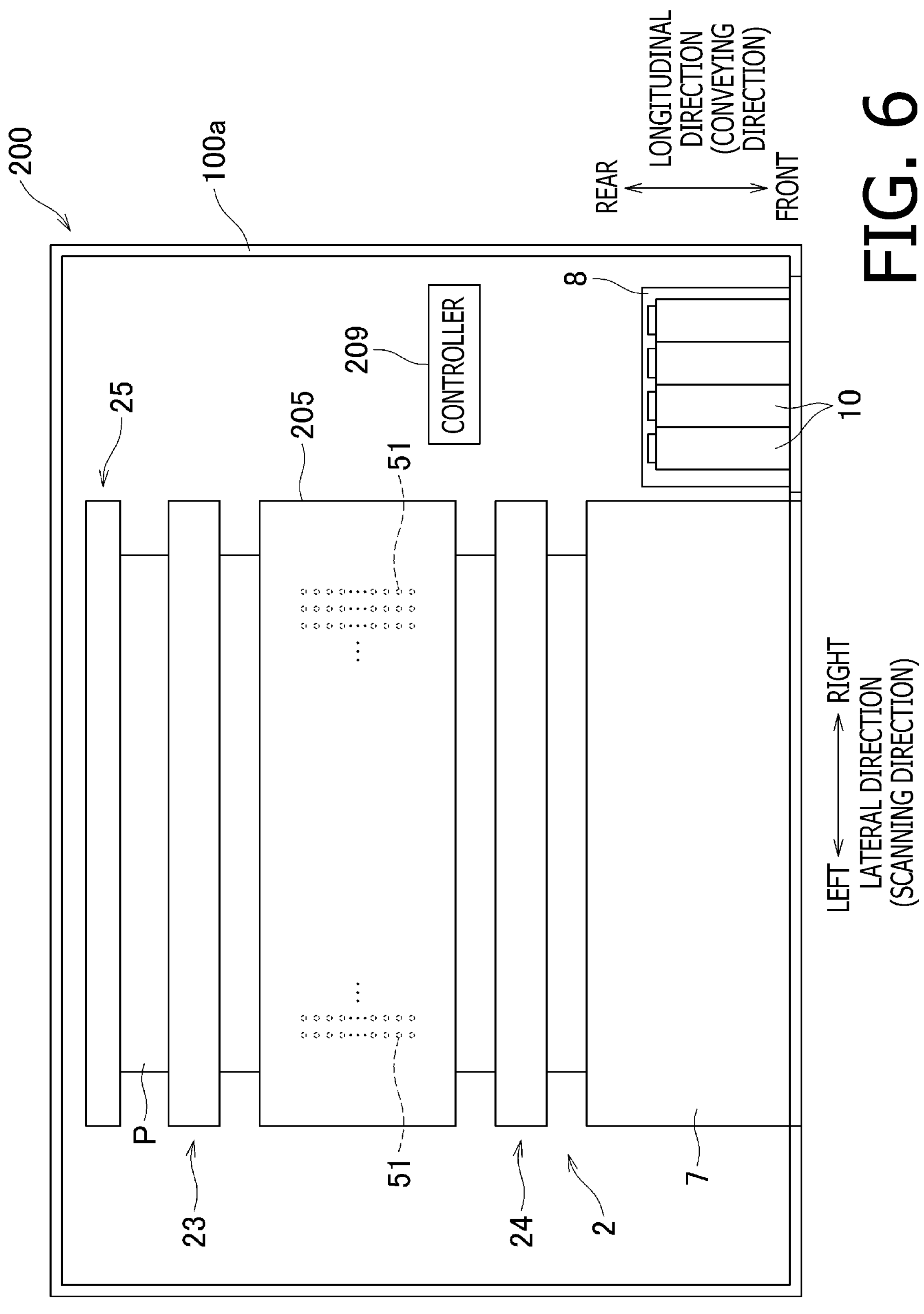
FIG. 6 is a schematic plan view of another printer.

Another printer 200 as an illustrative embodiment according to aspects of the present disclosure will be described with reference to FIG. 6. The printer 200 differs from the printer 100 mainly in that a head 205 and a controller 209 are provided in place of the head 5 and the controller 9. Hereinafter, the same reference numerals as those used in the printer 100 are used for features of the printer 200 common to those in the printer 100 as appropriate, and the descriptions thereof will be omitted as appropriate.

The head 205 includes a plurality of nozzles 51 formed on a lower surface thereof and the driver IC 52. When the driver IC 52 is driven under the control by the controller 209, ink is ejected from the nozzles 51 and an image is recorded on the sheet P conveyed by the conveying mechanism 2 when passing through an image recording position opposed to the lower surface of the head 205.

While the head 5 of the printer 100 is of a serial type that ejects ink from the nozzles 51 while moving in the scanning direction, the head 205 of the printer 200 is of a line type that ejects ink from the nozzles 51 at a fixed position.

The controller 209 controls the entire printer 200. To the controller 209, like the controller 9, the feed motor 21*a*, the intermediate motor 22*a*, the conveying motor 23*a*, the discharge motor 24*a*, the cutting motor 3*a*, the driver IC 52, the roll body sensor 71, the feed position sensor 72, the leading edge position sensor 81, the rotary encoder 82 and the like are electrically connected. The operating speeds of the feed motor 21*a*, the intermediate motor 22*a*, the conveying motor 23*a*, and the discharge motor 24*a* are controlled by the controller 209. Thus, the controller 209 can control a conveying speed of the sheet P by the conveying mechanism 2.

Like the controller 9, the controller 209 includes the CPU 91, the ROM 92, the RAM 93, the ASIC 94 and the like. Various pieces of fixed data stored in the ROM 92 of the controller 209 includes, in place of the data indicating the tables shown in FIGS. 4 and 5, data indicating a table showing a relationship between the sheet type, the cumulative used length, the roller nipping state, and the conveying speed of the sheet P.

The controller 209 causes the printer 200 to record and image on the sheet P based on a recording instruction transmitted from an external device (e.g., a PC or a smartphone) by a user. The image recording is performed by ejecting ink from the plurality of nozzles 51 of the head 205 at the same time as the conveying process of conveying the sheet P in the conveying direction by the conveying mechanism 2. The ink is ejected toward the sheet P moving in the conveying direction by being conveyed by the conveying mechanism 2.

The controller 209 executes, as the stain reduction control, (3) a control to reduce the conveying speed. That is, the controller 209 reduces the conveying speed of the sheet P in the image recording as compared with the case where the stain reduction control is not performed. In the stain reduction control, like the controller 9, the controller 209 executes the sheet type determination process, the cumulative used length acquisition process, and the roller nipping state acquisition process. Then, the controller 209 acquires the conveying speed from the table indicated by the data stored in the ROM 92 based on the determination and calculation results in the aforementioned processes, and controls the image recording so that the sheet P is conveyed at the acquired conveying speed. In the table, the conveying speed for "roll sheet" is slower than that for "cut sheet," the conveying speed gets slower as the cumulative used length increases, and the conveying speed for "one roller" is smaller than that for "two rollers." Each of the conveying speeds that can be acquired from the table is slower than that in the case where the stain reduction control is not performed. Thus, in the conveying process the sheet P, the conveying speed is reduced as compared with the case where the stain reduction control is not performed, the conveying speed is slower for "roll sheet" than that for "cut sheet," the conveying speed gets slower as the cumulative used length increases, and the conveying speed for "one roller" is slower than that for "two rollers."

According to the above-described configuration, the controller 209 executes (3) the control to reduce the conveying speed as the stain reduction control. Even if the sheet P once rises, the slower the conveying speed, the more likely the rising settles. Therefore, the occurrence of stain on the sheet can be suppressed. Since the conveying speed is reduced according to the sheet type and the cumulative used length, which are information related to occurrence of curling, the stain reduction control can be executed according to the state of curling. Since the conveying speed is reduced according to the roller nipping state by the two roller pairs, the stain reduction control can be performed to a degree corresponding to the possibility of occurrence of stain.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

[1] In the printer 100 described above, the stain reduction control (2) is performed by setting the waiting time between scanning processes to increase the time interval between the start of a scanning process and the start of the next scanning process. The stain reduction control of increasing the time interval may be performed by adopting other methods. For example, in the process of moving the carriage 4 from a position at the end of the scanning process to a position at the start of the next scanning process, a method of adjusting moving speed of the carriage 4 may be adopted. In this case, decreasing the moving speed corresponds to increasing the time interval. A method of adjusting the conveying speed of the sheet P in the conveying process executed between successive scanning processes (a process of conveying the sheet P by a predetermined distance in the conveying direction) may also be adopted. In this case, decreasing the conveying speed corresponds to increasing the time interval. In either method, by increasing the time interval between the start of a scanning process and the start of the next scanning process, even if the sheet P once rises by a scanning process, the lifting is likely to be settled by the next scanning process. Therefore, the occurrence of stain on the sheet P can be suppressed.

[2] In the printer 100 and 200 described above, the parameters are adjusted so that the effect of the stain reduction control becomes stronger for the roller nipping state of "one roller" than "two rollers." In addition to or instead, the parameters of the stain reduction control may be adjusted according to which of the conveying roller pair 23 and the discharge roller pair 24 is nipping the sheet Pin the roller nipping state of "one roller."

For example, in the case where the sheet P is the roll sheet Rp, considering the mode of use the roll sheet Rp, that is, the roll sheet Rp being used after being unrolled from the roll body R formed by winding a long sheet around the core member Rc, the curl is stronger at an upstream portion of the sheet P in the conveying direction. Therefore, in the case of one roll sheet Rp separated from the roll body R, the curl tends to be stronger in the vicinity of the trailing edge than in the vicinity of the leading edge in the conveying direction. A situation in which the sheet P is nipped by only the conveying roller pair 23 during image recording corresponds to a situation in which a portion of the one roll sheet Rp in the vicinity of the leading edge faces the head 5. On the other hand, a situation in which the sheet P is nipped by only the discharge roller pair 24 during image recording corresponds to a situation in which a portion of the one roll sheet Rp in the vicinity of the trailing edge faces the head 5. Therefore, the possibility that the sheet P comes into contact with the head 5 is higher when the sheet P is nipped by only the discharge roller pair 24 than when the sheet P is nipped by only the conveying roller pair 23.

Therefore, when the roller nipping state corresponds to "one roller," it is preferable that the parameters are adjusted so that the contact of the sheet P with the head 5 is more suppressed when the sheet P is nipped by the discharge roller pair 24 disposed on the downstream side in the conveying direction (hereinafter referred to as "when the discharge rollers are nipping") than when the sheet P is nipped by the conveying roller pair 23 disposed on the upstream side in the conveying direction (hereinafter referred to as "when the conveying rollers are nipping"). That is, it is preferable that the degree of reduction of the ejection amount is increased in the stain reduction control (1) of the printer 100 and that the waiting time is increased in the stain reduction control (2) of the printer 100 when the discharge rollers are nipping as compared with when the conveying rollers are nipping. In the stain reduction control (3) of the printer 200, it is preferable that the conveying speed of the sheet P is decreased when the sheet discharge rollers are nipping as compared with when the conveying rollers are nipping. It is thereby made possible to perform the stain reduction control to a degree corresponding to the possibility of occurrence of stain.

Figure 7:
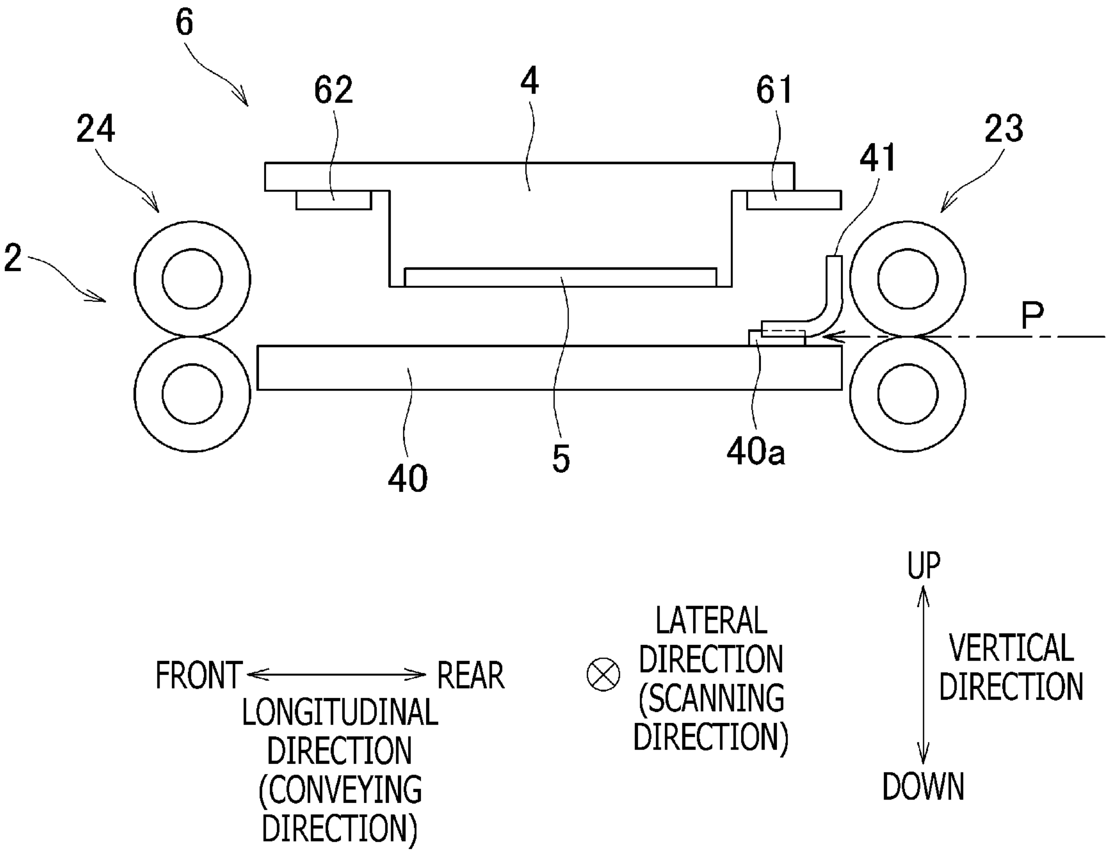
FIG. 7 is a schematic side view showing an internal configuration of a modified example.

[3] Parameters may be adjusted based not only on the nipping state the sheet P being nipped by the conveying roller pair 23 and the discharge roller pair 24 but also on peripheral configurations that have influences on the state of the sheet P. For example, influences of a platen 40 and a corrugated plate 41 shown in FIG. 7 on the sheet P may be taken into account. The platen 40 has a substantially rectangular parallelepiped shape and is disposed to face the head 5 in the vertical direction. The platen 40 supports the sheet P conveyed to a position facing the head 5 on its upper surface. A plurality of ribs 40*a* are formed on the upper surface of the platen 40 at constant intervals in the scanning direction. The ribs 40*a* are flat plate-like projection projecting upward from the platen 40 and are arranged so that the thickness direction is along the scanning direction. The corrugated plate 41 is alternately arranged with the ribs 40*a* at constant intervals in the scanning direction. The corrugated plate 41 is disposed slightly in front of conveying roller pair 23. A lower end of the corrugated plate 41 is opposed to the upper surface of the platen 40 with a slight gap therebetween. The lower end of the corrugated plate 41 is disposed slightly below an upper end of the ribs 40*a*.

When the sheet P is conveyed by the conveying mechanism 2, the sheet P passes over the ribs 40*a* in the vicinity of the downstream of the conveying roller pair 23, and at the same time passes through the gap between the lower end of the corrugated plate 41 and the upper surface of the platen 40. At this time, the lower end of the corrugated plate 41 presses the sheet P downward, thereby causing the sheet P to curve downward. Furthermore, upper ends of the ribs 40*a* lift the sheet P upward, thereby causing the sheet P to curve upward. Thus, the sheet P takes a shape that waves in the scanning direction.

Because of the action of the platen 40 and the corrugated plate 41 on the sheet P, the sheet P maintains a stable shape in the vicinity of the downstream of the conveying roller pair 23. On the other hand, there is no configuration for stabilizing the shape of the sheet Pin the vicinity of the discharge roller pair 24. Therefore, when the sheet P is nipped by only the conveying roller pair 23, the sheet P is stably held only at and in the vicinity of the conveying roller pair 23. On the other hand, when the sheet P is nipped by only the discharge roller pair 24, the sheet P is stably held at and in the vicinity of the discharge roller pair 24 and is also relatively stably held in the vicinity of the conveying roller pair 23. Therefore, in the state in which the sheet P is nipped by only the conveying roller pair 23, the rising of the sheet P within an area between the conveying roller pair 23 and the discharge roller pair 24 is less suppressed than in the state in which the sheet P is nipped by only the discharge roller pair 24. Therefore, considering the action of the platen 40 and the corrugated plate 41 on the sheet P, when the roller nipping state is "one roller," the stain reduction control to a degree corresponding to the possibility of occurrence of stain is realized by executing the stain reduction control so that the contact of the sheet P to the head 5 is more suppressed when the conveying rollers are nipping than when the discharge rollers are nipping.

When the effect of the corrugated plate 41 to stabilize the shape of the sheet P is relatively high, stain may be less likely to occur when the sheet P is not nipped by the discharge roller pair 24 and the sheet P is passing through the gap between the lower end of the corrugated plate 41 and the upper surface of the platen 40 than when the sheet P is nipped by only the discharge roller pair 24. In such a case, in the state in which the sheet P is nipped by only the discharge roller pair 24, the stain reduction control with a degree corresponding to the possibility of occurrence of stain is realized by executing the stain reduction control in such a manner that the contact of the sheet P to the head 5 is more suppressed than in the state in which the sheet P is not nipped by the discharge roller pair 24 and the sheet P is passing through the gap between the lower end of the corrugated plate 41 and the upper surface of the platen 40.

[4] According to the printers 100 and 200 described above, the parameters for the stain reduction control are adjusted according to at least one selected from the group of the sheet type, the cumulative used length, and the roller nipping state. Alternatively, or in addition, a configuration may be adopted in which the parameters are adjusted based on a detection result by a sensor that directly detects the degree of curling of the sheet P. Such a sensor may include, for example, an optical sensor provided on a side of the feeding path or the conveying path of the sheet P. The optical sensor detects how much the sheet P is rising or deviating from the correct path. Then, the controller 9 or 209 adjusts various parameters for the stain reduction control to values corresponding to the degree of the rise or deviation indicated by the detection result by the optical sensor.

[5] In the printer 100 described above, as the stain reduction control, one of or both (1) the control to reduce the amount of ink ejected from the head 5 and (2) the control to provide a waiting time between successive scanning processes in the image recording are executed. Alternatively or additionally, control for increasing resolution of image recording may be executed as the stain reduction control. When the resolution of image recording is increased, a larger number of so-called interlace processing and singling processing are executed according to the increase. As such, the ink ejection amount in one scanning process decreases and the conveying amount of the sheet P in one conveying process decreases. Thus, the rising of the sheet P is suppressed, and the possibility of the sheet P coming into contact with the head 5 is reduced, and as a result, the occurrence of stain on the sheet P is suppressed. In this control, the size of the resolution may be adjusted according to at least one selected from the group of the sheet type, the cumulative used length, and the roller nipping state. With the adjustment of the size of the resolution, both the degree of reduction of the ink ejection amount in one scanning process and the degree of reduction of the conveying amount of the sheet P in one conveying process are adjusted.

[6] The cases where aspects of the present disclosure are applied to the printers 100 and 200 have been described. However, aspects of the present disclosure can also be applied to a multi-function machine, a copier, or the like as long as it is an inkjet type image recording apparatus that ejects ink from a head.

The printer 100 and the printer 200 are examples of a "liquid ejection apparatus" according to aspects of the present disclosure. The longitudinal direction is an example of a "first direction" according to aspects of the present disclosure. The feed tray 1 is an example of a "medium container" according to aspects of the present disclosure. The cut sheet Kp is an example of a "short sheet-like medium" according to aspects of the present disclosure. The roll sheet Rp is an example of a "long sheet-like medium" according to aspects of the present disclosure. The sheet P is an example of a "sheet-like medium" according to aspects of the present disclosure. The conveying roller pair 23 is an example of a "first roller pair" according to aspects of the present disclosure. The discharge roller pair 24 is an example of a "second roller pair" according to aspects of the present disclosure. The conveying direction is an example of the "first direction" according to aspects of the present disclosure. The operation of the conveying mechanism 2 to convey the sheet P in the conveying direction with the conveying roller pair 23 and the discharge roller pair 24 is an example of a "first moving operation" according to aspects of the present disclosure. The head 5 and the head 205 are examples of a "liquid ejection head" according to aspects of the present disclosure. The operation of the head 5 to eject ink is an example of an "ejection operation" according to aspects of the present disclosure. The scanning direction is an example of a "second direction" according to aspects of the present disclosure. The moving mechanism 6 moving the head 5 in the scanning direction by moving the carriage 4 is an example of a "second moving operation" according to aspects of the present disclosure. The moving mechanism 6 and the above-described conveying mechanism 2 constitute a "mover" according to aspects of the present disclosure. The prescribed distance is an example of a "first length" according to aspects of the present disclosure. The same length as the prescribed distance in the conveying direction and the length different from the prescribed distance in the conveying direction are examples of a "second length" according to aspects of the present disclosure. The sheet type acquired by the following process is an example of "medium information indicating characteristics of the sheet-like medium" according to aspects of the present disclosure. The cumulative used length acquired by the following process is an example of "medium information indicating a usage condition of the sheet-like medium" according to aspects of the present disclosure. The detection result by the optical sensor is an example of "medium information" according to aspects of the present disclosure.

What is claimed is:

1. A liquid ejection apparatus comprising:

a medium container configured to accommodate a sheet-like medium;

a liquid ejection head configured to execute an ejection operation of ejecting liquid;

a mover configured to move the sheet-like medium fed from the medium container relative to the liquid ejection head; and a controller, wherein the mover is configured to execute, among a first moving operation of moving the sheet-like medium in a first direction and a second moving operation of moving the liquid ejection head in a second direction orthogonal to the first direction, at least the first moving operation, and wherein the controller:

causes the liquid ejection head and the mover to alternately perform execution of the first moving operation and execution of the ejection and second moving operations or to simultaneously execute the ejection operation and the first moving operation; and adjusts at least one selected from the group of:

an amount of liquid to be ejected from the liquid ejection head in the ejection operation;

a time interval between the start of the ejection operation and the start of a next ejection operation when alternately performing execution of the first moving operation and execution of the ejection and second moving operations; and a moving speed of the sheet-like medium by the first moving operation when simultaneously executing the ejection operation and the first moving operation, according to medium information relating to curling of the sheet-like medium and indicating a characteristic of the sheet-like medium fed from the medium container so that contact of the sheet-like medium with the liquid ejection head is suppressed, wherein, the medium container includes a first section configured to accommodate a roll body in which a long sheet-like medium is wound in a roll shape and a second section configured to accommodate a plurality of short sheet-like media shorter than the long sheet-like medium in a stacked state, the long sheet-like medium and the plurality of short sheet-like media are selectively fed from the medium container toward the liquid ejection head, and the medium information indicates, as the characteristic of the sheet-like medium, whether the sheet-like medium to be fed from the medium container is the long sheet-like medium or one of the plurality of short sheet-like media.

2. The liquid ejection apparatus according to claim 1, wherein, in the adjustment, the controller executes at least one selected from the group of:

reducing the amount of liquid;

increasing the time interval; and reducing the moving speed of the sheet-like medium, to a degree according to a degree of curling of the sheet-like medium fed from the medium container represented by the medium information.

3. The liquid ejection apparatus according to claim 1, wherein:

the medium information further indicates a usage condition of the sheet-like medium including a cumulative used length of the long sheet-like medium since the roll body accommodated in the medium container is first unwound and used.

4. The liquid ejection apparatus according to claim 3, wherein:

the long sheet-like medium is discharged to outside of the liquid ejection apparatus as one sheet-like medium separated from the roll body, and the controller adjusts, for the one sheet-like medium, at least one selected from the group of the amount of liquid, the time interval, and the moving speed of the sheet-like medium according to the medium information indicating the cumulative used length up to a leading edge or a trailing edge of the one sheet-like medium for each sheet.

5. The liquid ejection apparatus according to claim 3, wherein:

the first moving operation is an operation of moving the sheet-like medium by a first length in the first direction, the ejection operation is an operation of ejecting liquid to an area of the sheet-like medium, the area having a second length in the first direction, the long sheet-like medium is ejected to outside of the liquid ejection apparatus as one sheet-like medium separated from the roll body, and the controller adjusts, for the one sheet-like medium, at least one selected from the group of the amount of the liquid for the area, the time interval, and the moving speed of the sheet-like medium according to the medium information indicating the cumulative used length up to the area having the second length.

6. A liquid ejection apparatus comprising:

a medium container configured to accommodate a sheet-like medium;

a liquid ejection head configured to execute an ejection operation of ejecting liquid;

a mover configured to move the sheet-like medium fed from the medium container relative to the liquid ejection head, the mover including a first roller pair configured to move the sheet-like medium fed from the medium container along a first direction while nipping the sheet-like medium, and a second roller pair configured to move the sheet-like medium moved by the first roller pair along the first direction while nipping the sheet-like medium downstream of the first roller pair in the first direction; and a controller, wherein the mover is configured to execute, among a first moving operation of moving the sheet-like medium in a first direction and a second moving operation of moving the liquid ejection head in a second direction orthogonal to the first direction, at least the first moving operation, and wherein the controller:

causes the liquid ejection head and the mover to alternately perform execution of the first moving operation and execution of the ejection and second moving operations or to simultaneously execute the ejection operation and the first moving operation; and adjusts at least one selected from the group of:

an amount of liquid to be ejected from the liquid ejection head in the ejection operation;

a time interval between the start of the ejection operation and the start of a next ejection operation when alternately performing execution of the first moving operation and execution of the ejection and second moving operations; and a moving speed of the sheet-like medium by the first moving operation when simultaneously executing the ejection operation and the first moving operation, according to whether the first roller pair and the second roller pair are both nipping the sheet-like medium or only one of the first roller pair and the second roller pair is nipping the sheet-like medium so that contact of the sheet-like medium with the liquid ejection head is suppressed, wherein the controller adjusts at least one selected from the group of the amount of liquid, the time interval, and the moving speed of the sheet-like medium so that when only one of the first roller pair and the second roller pair is nipping the sheet-like medium, the contact of the sheet-like medium with the liquid ejection head is more suppressed than when both the first roller pair and the second roller pair are nipping the sheet-like medium.

7. The liquid ejection apparatus according to claim 6, wherein, in the adjustment, the controller executes at least one selected from the group of:

reducing the amount of liquid;

increasing the time interval; and reducing the moving speed of the sheet-like medium, to a degree according to whether the first roller pair and the second roller pair are both nipping the sheet-like medium or only one of the first roller pair and the second roller pair is nipping the sheet-like medium.

8. The liquid ejection apparatus according to claim 7, wherein the controller adjusts the degree of at least one selected from the group of the reducing the amount of liquid, the increasing the time interval, and the reducing the moving speed of the sheet-like medium to be higher when only one of the first roller pair and the second roller pair is nipping the sheet-like medium than when both the first roller pair and the second roller pair are nipping the sheet-like medium.

9. A liquid ejection apparatus comprising:

a medium container configured to accommodate a sheet-like medium;

a liquid ejection head configured to execute an ejection operation of ejecting liquid;

a mover configured to move the sheet-like medium fed from the medium container relative to the liquid ejection head; and a controller, wherein the mover is configured to execute, among a first moving operation of moving the sheet-like medium in a first direction and a second moving operation of moving the liquid ejection head in a second direction orthogonal to the first direction, at least the first moving operation, and wherein the controller:

causes the liquid ejection head and the mover to alternately perform execution of the first moving operation and execution of the ejection and second moving operations or to simultaneously execute the ejection operation and the first moving operation; and adjusts at least one selected from the group of:

an amount of liquid to be ejected from the liquid ejection head in the ejection operation;

a time interval between the start of the ejection operation and the start of a next ejection operation when alternately performing execution of the first moving operation and execution of the ejection and second moving operations; and a moving speed of the sheet-like medium by the first moving operation when simultaneously executing the ejection operation and the first moving operation, according to medium information relating to curling of the sheet-like medium and indicating one of or both a characteristic and usage condition of the sheet-like medium fed from the medium container so that contact of the sheet-like medium with the liquid ejection head is suppressed, wherein:

the medium container is configured to accommodate a roll body in which a long sheet-like medium is wound in a roll shape, and the medium information indicates, as the usage condition of the sheet-like medium, a cumulative used length of the long sheet-like medium since the roll body accommodated in the medium container is first unwound and used.

* * * * *